Patented Jan. 20, 1931

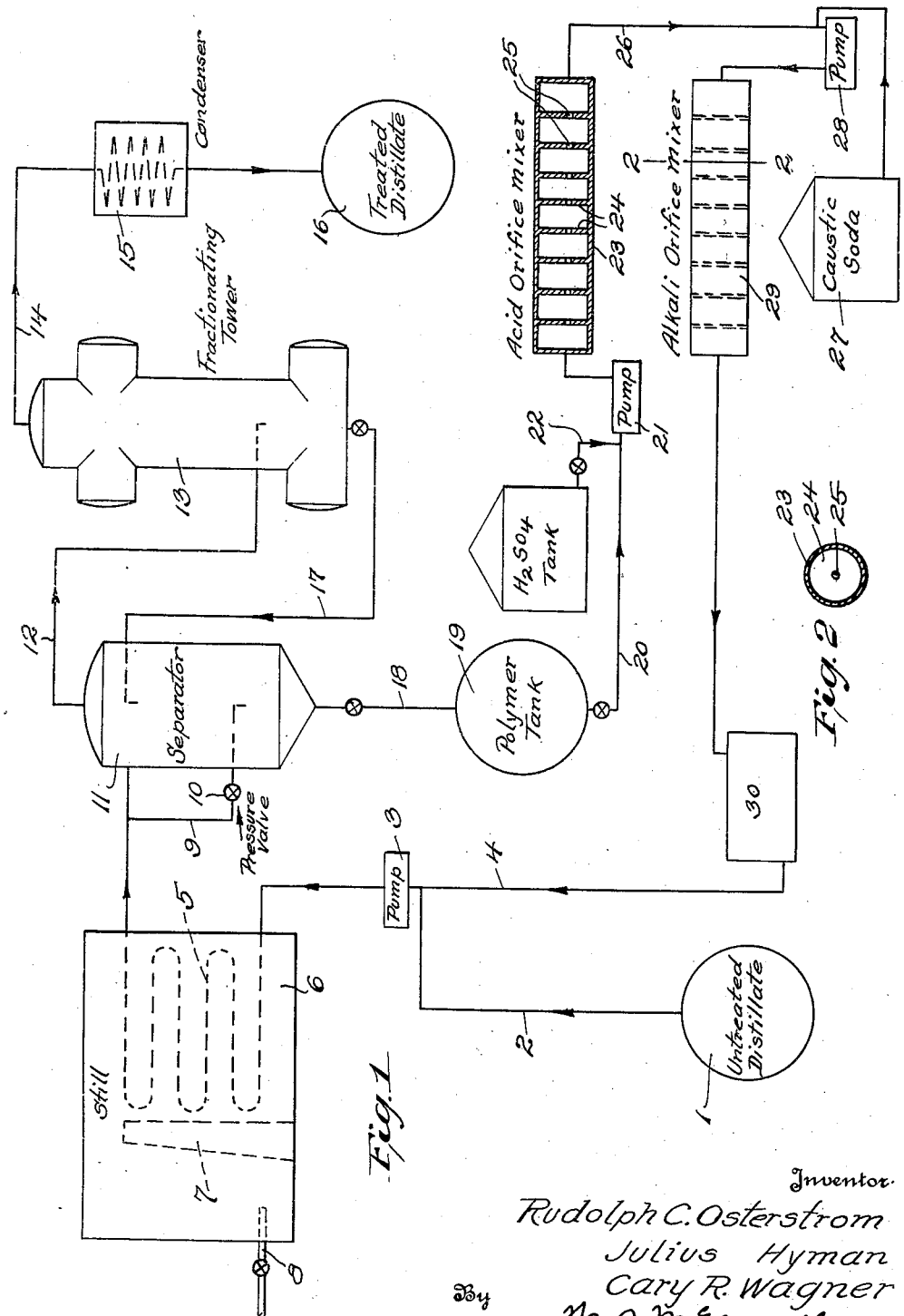

1,789,413

UNITED STATES PATENT OFFICE

RUDOLPH C. OSTERSTROM, JULIUS HYMAN, AND CARY R. WAGNER, OF CHICAGO, ILLINOIS, ASSIGNORS TO THE PURE OIL COMPANY, OF CHICAGO, ILLINOIS, A CORPORATION OF OHIO

METHOD OF POLYMERIZING HYDROCARBON DISTILLATES

Application filed January 25, 1930. Serial No. 423,512.

This invention relates to the art of removing gum-forming and color-imparting bodies from cracked petroleum distillates. Petroleum distillates obtained from high temperature or vapor phase cracking systems particularly contain certain unsaturated compounds of an undesirable character, such as diolefines, which, if permitted to remain in the distillate, promote or result in the formation in such distillates of gum compounds which are highly undesirable in motor fuels particularly. It is, therefore, an object of the present invention to provide a continuous and effective method for treating such cracked distillates, substantially without conversion, whereby the undesirable compounds are subjected to positively produced and accelerated polymerization reactions to produce a high boiling polymer-containing fraction and a low boiling polymer-free fraction, which fractions are readily separable through fractionation to permit the desired low boiling fraction to be separately collected and stored as a finished motor fuel product and one which is relatively free, upon analysis, from color-imparting and gum-forming compounds.

Heretofore it has been customary in removing gum forming compounds from cracked petroleum distillates to pass the latter while in the vapor phase through a catalyst such as fuller's earth or to employ sulfuric acid as a polymerizing agent. Fuller's earth, however, rapidly loses its catalytic activity and it is necessary to maintain the oils in contact with fresh fuller's earth to secure a desired degree of polymerization, which results in excessive treating costs. Sulfuric acid in concentrated form tends not only to destroy the gum-forming and color-imparting bodies but also attacks the desirable constituents and produces a high percentage of loss in the treated oils.

In accordance with the present invention use is made of a catalyst consisting of the sodium salts of sulfonic acids produced by subjecting polymerized hydrocarbons to successive treatment with concentrated sulfuric acid and sodium hydroxide. In a practical application of the invention a cracked hydrocarbon distillate is passed under pressure through a vaporizing heater and while the distillate is passing through the heater in a continuous stream of restricted cross-section, it is thoroughly commingled and brought into contact with the polymerizing agent consisting of sodium sulfonates in polymerized hydrocarbons, the latter having been obtained from a preceding operation of the process and returned after treatment with acid and alkali for passage with the fresh distillates through the heated polymerization zone of the process. Polymerized compounds of themselves tend in some degree to promote or facilitate the formation of additional polymerized compounds in the fresh distillates initially undergoing treatment. However, we have found that when these polymers contain sodium sulfonates their effectiveness in promoting polymerization reactions is substantially advanced and an effective and efficient process is thus produced.

For a further understanding of the invention reference is to be had to the following description and the accompanying drawing, wherein:

Figure 1 is a diagrammatic view of the apparatus used in carrying the present invention into effect, the figure also serving as a flow diagram for the process, and Figure 2 is a transverse sectional view on the line 2—2 of Figure 1.

Referring more particularly to the drawing, the numeral 1 designates a storage tank in which is contained a hydrocarbon distillate secured from a cracking or conversion unit (not shown). Many cracked distillates, however produced, tend to produce gum compounds upon standing, upon storage or upon exposure to light and air, and this is especially true in reference to distillates obtained by high temperature methods of conversion wherein large percentages of unsaturated compounds are present in the distillates which contain the highly reactive gum-forming compounds, such as diolefines. The present invention has reference, therefore, to the treatment of distillates obtained from high temperature or vapor phase methods of conversion or cracking particularly, although it is, of course, applicable to other cracked hydrocarbons.

Leading from the tank 1 is a pipe 2 in which is located a pump 3. A pipe line 4 enters the inlet side of the pump 3 conjointly with the line 2, and through the medium of the pipe line 4 polymerized hydrocarbon compounds containing sodium sulfonates are brought into direct contact commingled in relationship with the cracked liquid oils removed from the tank 1 or from any other desired source of supply.

This combined oil stream consisting first, of the cracked petroleum distillates and, second, of the polymerized oils containing sodium sulfonates, is advanced by the pump 3 through a heating coil 5 which constitutes the polymerizing zone of the system. The coil 5 is located in a furnace setting 6 and is arranged on one side of a bridge wall 7, while burners 8 are arranged on the opposite side of said bridge wall. By the operation of the burners 8 the oil stream passing through the coil 5 is preferably heated to vaporizing temperatures of approximately 650° to 700° F. and, through the medium of the pump 3, the oils comprising said stream are maintained under super-atmospheric pressures of substantially 200 pounds per square inch. The lower boiling oils while passing through the zone 5 are thus permitted to vaporize, since the pressures employed are not sufficiently high to prevent such vaporization at the temperatures specified, and while the oil is in the vaporized state it reacts freely with the high boiling sodium sulfonate containing polymers to effect the necessary polymerization of the undesired compounds present in the vaporized distillate, especially the diolefines. The sodium sulfonate compounds present in the polymerizing zone by this method of operation promote the polymerization reactions of the gum-forming compounds present in the distillate obtained from the tank 1, whereby higher boiling compounds are produced in which the color-imparting and gum-forming constituents are present so that the oils discharged from the zone 5 contain a high boiling polymer fraction and a low boiling polymer-free fraction which may be conveniently separated through fractionation.

An outlet line 9 is provided which leads from the discharge side of the coil 5 and is provided with a pressure reduction valve 10. The outlet end of the line 9 enters a separator 11, and, due to the decreased pressures which exist in the separator, as compared with the pressures in the coil 5, the oil is permitted to readily separate so that the light vaporized fractions pass upwardly through the separator and out of the latter through a line 12 and are thence conducted to a fractionating tower 13, wherein further separation of the low and high boiling compounds present in the oils takes place. The low boiling oils are discharged from the top of the tower 13 by way of a pipe line 14, and are then passed through a condenser 15 in which the oils are reduced to liquid form and are discharged from the condenser into a receiver 16 in the form of a finished motor fuel. These oils are substantially free from compounds which produce undesirable gums and color in the oils upon standing or exposure to light and air, the treatment of the oils in the coil 5 having accelerated the formation of such gum-forming constituents so that the latter may be removed at the time the oil is being refined rather than by a subsequent and more prolonged treatment. If desired, the liquid oils removed from the bottom of the fractionating tower 13 may be returned to the top of the separator 11 by the employment of the line 17, and these oils may be used to scrub the vapors passing upwardly through the separator 11.

The polymerized oils are removed from the bottom of the separator 11 by way of a valved outlet line 18 and passed to a polymer-containing tank 19. From the tank 19 there leads an outlet line 20 which extends to a pump 21. Entering the line 20 on the inlet side of the pump 21 is a pipe line 22 which leads from a tank containing concentrated sulfuric acid, for example, 66° Bé. acid. By the pump 21 the acid treated polymers are then forced through an orifice mixer 23 which consists, as usual, of a shell containing a plurality of spaced plates 24 in which orifices 25 of desired area are found. The acid and oils are thus thoroughly intermingled during passage through the mixer 23 and during this operation it is desirable to use as low a temperature as possible to avoid coking the polymerized oils. After the reaction has been completed the acid treated oil is discharged from the mixer 23 through a pipe line 26, and is then neutralized with the minimum quantity of concentrated sodium hydroxide solution necessary to neutralize the acids present. The sodium hydroxide may be brought into contact with the acid treated oils by being drawn as a concentrated solution from a tank 27 and forced by means of a pump 28 together with the acid-polymers through a second orifice mixer 29, wherein the desired neutralization is secured. The neutralized oils may then be deilvered to a tank 30 with which is connected the pipe line 4.

The present invention thus provides a continuous system for effecting the polymerization of the undesirable diolefines contained in cracked motor fuel distillates. Generally, the system possesses many important advantages over heretofore standard methods of practice in operations of this character in that, first, it eliminates the use of a catalyst or adsorbent of the fuller's earth type, second, it makes use of a portion of the polymers obtained from the system as a treating agent in the polymerizing zone, third, it permits such polymers to be rendered more effective in promoting the desired reactions by combining them with sodium sulfonates which have been found to be highly effective in the treatment of distillates, particularly those wherein difficulty is encountered in effecting completely the removal of the undesirable compounds therefrom and, finally, the system described is of great advantage in the matter of reducing operating costs and the elimination of intermittent operations.

What is claimed is:

1. The method of removing gum-forming compounds from cracked petroleum distillates which comprises vaporizing such distillates in the presence of polymerized compounds containing sodium sulfonates to accelerate the polymerization of the gum-forming compounds in said vaporized distillates, then separating the light desirable oils from the polymerized compounds, and separately collecting and condensing the light oils.

2. The method of removing gum-forming compounds from cracked petroleum oils, which comprises vaporizing a body of such oils in a polymerizing zone while said oils are subjected to super-atmospheric pressures, then separating the lighter vaporized oils from the heavier polymerized fraction thereof, condensing and collecting the desired light fraction, treating the heavy polymer-containing fraction successively with an acid and alkali to secure a solution or suspension of sodium sulfonates in polymerized oils, and returning said latter oils to the polymerizing zone for admixture with the oils undergoing treatment in said zone.

3. The method of removing gum-forming compounds from cracked petroleum distillates, which comprises passing such distillates through a vaporizing zone under pressures in excess of those required to overcome frictional resistance between the vapors and the walls of said zone, intimately mixing with the vapors in said zone high boiling polymerized oil containing sodium salts of sulfonic acids, whereby the polymerized oils serve to facilitate the polymerization of gum-forming compounds in said distillates, and subsequently separating the low boiling compounds from the polymerized high boiling compounds following discharge of the oils from the polymerizing zone.

4. In a process for removing gum-forming compounds from cracked petroleum distillates, the step which consists in introducing into a vaporized body of such distillates an added body of high boiling polymerized oils containing sodium sulfonates.

5. In a process for removing gum-forming compounds from cracked petroleum distillates, the step which consists in adding to a vaporized body of such distillates while the latter are maintained under super-atmospheric pressure a body of previously treated material in the form of high boiling polymerized oils containing sodium sulfonates.

6. In a process for effecting the removal of gum-forming compounds from cracked petroleum distillates, the step which consists in contacting said distillates while in vaporized form and under super-atmospheric pressures with polymerized oils containing sodium sulfonates in solution or suspension.

7. In a process for removing gum-forming compounds from cracked petroleum oils, the steps which comprise subjecting a vaporized body of such oils to polymerization reactions by heating such oils while under the influence of super-atmospheric pressures in the presence of extraneously added polymerized compounds containing sodium sulfonates, subsequently separating the polymerized compounds from the desired lighter fractions, treating said polymerized compounds successively with sulphuric acid and sodium hydroxide or carbonate to obtain a solution or suspension of sodium sulfonates in the polymerized oils, and returning a portion, at least, of the latter oils to the oils present in the polymerizing zone.

8. In a process for removing gum-forming compounds from cracked petroleum distillates, the steps which comprise passing a stream of such distillates continuously through a heated polymerizing zone, vaporizing the distillates during their passage through said zone and maintaining the same under super-atmospheric pressures while in said zone, continuously adding to the distillates for passage through said zone a body of polymerized oils containing sodium sulfonates in solution or suspension in order to promote polymerization reactions on the part of the distillates within said zone, continuously separating the light polymer-free fraction of such vapors from the heavier polymer-containing fractions thereof following passage through said zone, and in continuously returning the polymer-containing fraction combined with sodium sulfonates to said polymerizing zone for admixture with the distillates passing through said zone.

9. In a process for removing gum-forming compounds from cracked petroleum distillates, the steps which comprise continuously passing a stream of such distillates through an externally heated polymerizing zone, introducing into the distillates entering said zones polymerizing agent consisting of a solution or suspension of sodium sulfonates in petroleum polymers for passage in connection with said distillates through said zone, continuously discharging the products from said polymerizing zone under reduced pressures into a separating zone, removing from one point of said separating zone the light polymer-free products, withdrawing from another point of said separating zone the polymer-containing fraction of said oils, continuously treating said polymer-containing fraction successively with sulfuric acid and an alkali to procure a solution or suspension of sodium sulfonates in polymers, and continuously returning a portion, at least, of said acid-alkali treated polymers to the polymerizing zone.

In testimony whereof we affix our signatures.

RUDOLPH C. OSTERSTROM.
JULIUS HYMAN.
CARY R. WAGNER.